J. A. VAN DER NOLLE.
METHOD FOR FORMING INSULATING MATERIAL.
APPLICATION FILED JULY 7, 1920.
1,403,822. Patented Jan. 17, 1922.
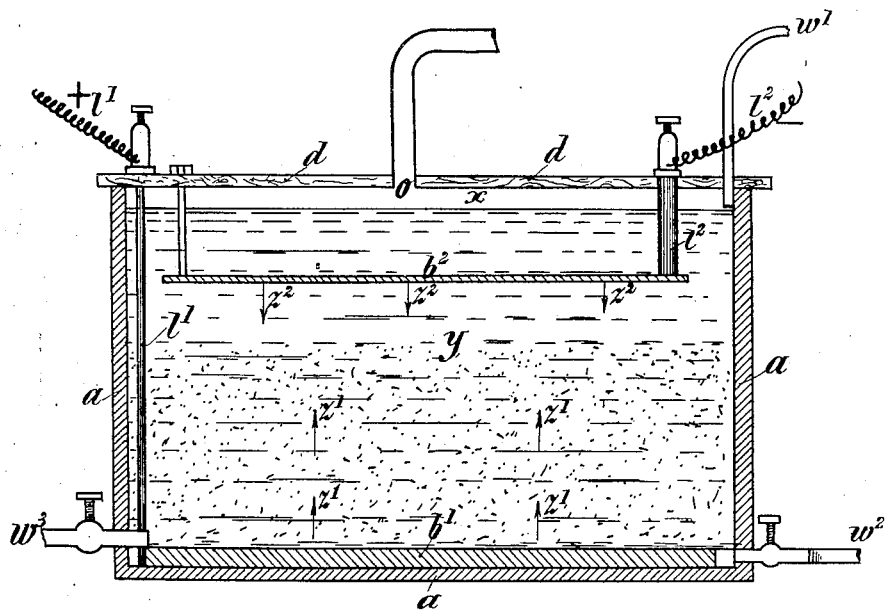
INVENTOR:
JOHANNES AUGUSTUS VAN DER NOLLE.
ATTORNEY.

UNITED STATES PATENT OFFICE.

JOHANNES AUGUSTUS VAN DER NOLLE, OF ZAANDAM, NETHERLANDS.

METHOD FOR FORMING INSULATING MATERIAL.

1,403,822.  Specification of Letters Patent.  Patented Jan. 17, 1922.

Application filed July 7, 1920. Serial No. 394,462.

*To all whom it may concern:*

Be it known that I, JOHANNES AUGUSTUS VAN DER NOLLE, a subject of the Queen of the Netherlands, and resident of Zaandam, Netherlands, have invented certain new and useful Improvements in Methods of Forming Insulating Material, for which I have filed applications in the following countries: Holland, July 19, 1919, and Germany, July 25, 1919, of which the following is a specification.

The present invention has for its object an insulating material which is intended to be used for sucking or absorbing the electrolyte in galvanic elements and the like devices relating to the electro chemical branch, outside and inside the electrode plates. With this object in view the raw material from which the insulating material is obtained should be freed from all elements preventing the absorbing capacity, increasing the resistance and decomposing the metal parts or combinations of the electrodes or elements and the like by their chemical action. By making use of said material inside the electrodes, it should be thoroughly mixed with the other substances in form of powder used in the construction of the electrodes, in order to get a satisfactory result. It is therefore necessary to eliminate any sticky substances which would prevent such thorough mixing and agglomerate forming masses.

As a convenient material for the above purpose may be used wooden, fibrous substances when finely pulverized and freed from the noxious elements. As raw materials wood, straw, turf and the like plant substances, may be used. Heretofore such substances have been used exteriorly of the electrodes, in shape of plates or larger objects, from which the noxious elements had not been wholly eliminated, and at the inside of the electrodes they have been used in shape of saw dust containing all the noxious substances.

As the use of the said substances was not practical, the same were discarded with the exception of the wooden insulating plates, and even in such plates the noxious substances, particularly the acetic acid, cannot be eliminated by any known means, and it is well known that the slightest portions of acetic acid will cause a gradual destruction of the metal components. In order to fully separate said substances, it is necessary to grind the material to a fine powder. In this condition the noxious substances may be easily eliminated. These latter comprise acids, such as acetic acid, resins, albuminous substances and particles of starch and the like, which either act upon the metal parts or increase the resistance and diminish the absorbing capacity or, when they are sticky, prevent a thorough mixing of the ground materials serving for forming the electrodes.

The separating of the noxious substances from the insulating material may be done by treating the latter by means of acids or alkali compounds, preferably by continuous boiling and stirring; the preferred manner of treating the same is as follows:

The material finely pulverized is poured into a vessel preferably made of glass, stone or any like insulating substance. The vessel is then filled with diluted sulphuric acid or any other solution such as an alkaline solution, with the object of freeing the wooden particles from the soluble substances. At the bottom of the vessel is a metal plate, of lead or other convenient material. Within the liquid, near the upper edge of the vessel, is mounted a second metal plate. Both plates are connected with the poles of a source of electricity. Between both said plates the material to be treated is uniformly spread. As soon as an electric current is established, a large quantity of gas bubbles are formed whilst the liquid becomes hot. Owing to the many bubbles of oxygen and hydrogen resulting from the decomposing of the electrolyte, the dust whirls within the electrolyte and is freed from all soluble substances.

The mass is then thoroughly scoured in water and dried after which it is very porous and able to absorb large amounts of liquids. This property is of a great advantage either when the mass is applied on the outside or when used at the inside of the electrodes. The effect of the electrodes being based mostly upon the influence of the electrolyte, and the latter entering very slowly through the narrow pores into the inner part of the electrodes, it is of great advantage to provide corpuscles within the electrodes which not only absorb a large amount of liquid, but moreover exert a sucking action upon the outer electrolyte, which contributes for getting a better result and a higher efficiency.

In the accompanying drawing the arrangement of the device for removing noxious substances from saw dust is shown by way of example:

The figure illustrates a vertical sectional view through a tank employed in connection with my invention.

$a$ designates a vessel of earthenware having two plates of lead $b^1$ and $b^2$ connected by means of insulated wires $1^1$ and $1^2$ with the poles of a source of electricity. The vessel is filled with electrolyte such as an aqueous solution evenly decomposed by the electric current up to line $x$ and with dust such as resinous woods, pines, firs or the like up to line $y$. The proportion of sawdust and electrolyte should advantageously be $1:4$, that is, in the drawing: $y:x=1:4$, of course the sawdust is preferably introduced into the receptacle in dry state, then the electrolyte is poured upon the sawdust. $y$ is the line up to which the sawdust may be supplied. After pouring the acid and after the current flows through the mass, the proportion is of course changing. The gas bubbles issuing from the plates produce a whirling within the electrolyte, which puts into motion the particles of wood, and owing to the combined effect of lye, electric current and heat, the soluble substances are removed from the material. An aperture O is provided on the lid of the vessel for leading off the gases and vapours through a duct. $W^2$ is a cock provided with a tube for discharging the electrolyte. $W^1$ is a tube for introducing water for scouring the mass. The water is afterwards discharged through the tube $W^3$.

Having now fully described my said invention, what I claim and desire to secure by Letters Patent, is:

A process for preparing powder from fibrous material consisting in grinding and sifting the fibrous material to form a powder, subjecting the powder to a bath of a solution of diluted sulphuric acid, in passing through the mixture an electric current between electrode plates whereby bubbles of oxygen and hydrogen whirl through the mixture for putting in motion the particles of fibrous material, the acids, resins, albuminous compounds and other soluble substances of which are decomposed by the action of the electric current and securing the resulting substance by means of water.

In testimony whereof I have hereunto set my hand in presence of two witnesses.

JOHANNES AUGUSTUS van der NOLLE.

Witnesses:
H. G. KRUJPERL,
F. V. J. LANGENDYK.